United States Patent
Wilson et al.

[15] 3,672,403
[45] June 27, 1972

[54] CAP AND SEALING MEANS THEREFOR

[72] Inventors: Fred A. Wilson, Florence, Ky.; Norman T. Allen, Cincinnati, Ohio

[73] Assignee: Dover Corporation, Cincinnati, Ohio

[22] Filed: July 27, 1970

[21] Appl. No.: 58,603

[52] U.S. Cl............................................138/89, 220/55 T
[51] Int. Cl.......................................................F16l 55/10
[58] Field of Search .................138/89; 166/92, 93, 94, 192; 220/55 P, 55 T, 57; 285/311, 320; 292/30, 256, 258, 259, 260

[56] References Cited

UNITED STATES PATENTS

| 2,482,198 | 9/1949 | Melichar | 137/515.5 X |
| 128,207 | 6/1872 | Booth et al. | 138/89 |
| 838,093 | 12/1906 | Emmons | 138/89 |
| 1,439,000 | 12/1922 | Jacobs | 292/256 X |

FOREIGN PATENTS OR APPLICATIONS

| 120,178 | 6/1927 | Switzerland | 220/57 |
| 757,093 | 10/1933 | France | 220/57 |
| 756,480 | 9/1933 | France | 285/311 |
| 11,179 | 1896 | Great Britain | 138/89 |
| 1,433,401 | 2/1966 | France | 220/57 |
| 564,704 | 11/1932 | Germany | 220/57 |

Primary Examiner—Alan Cohan
Assistant Examiner—David J. Zobkiw
Attorney—Kinney and Schenk

[57] ABSTRACT

A cap and sealing means therefor for capping and sealing the end of a pipe is disclosed. The cap includes a pair of pivotally mounted locking arms for coengagement with an adaptor ring, the adaptor ring being mounted on the end of the cap to be sealed. The locking arms and adaptor ring have cooperative flat surfaces to insure a firm lock. A sealing ring is mounted in the cap for sealing engagement with the flat portion of the adaptor ring when the cap and adaptor ring are in locking engagement. Each locking arm is pivotally interconnected with a single movable element wherein movement of the single element permits engagement or disengagement of the locking arms with the adaptor ring.

8 Claims, 4 Drawing Figures

PATENTED JUN 27 1972 3,672,403

INVENTORS
FRED A. WILSON
NORMAN T. ALLEN

BY *Kinney & Schenk*
ATTORNEYS 3,672,403

CAP AND SEALING MEANS THEREFOR

BACKGROUND OF THE INVENTION

This invention relates generally to caps and seals and more particularly to a cap and seal for closing the end of a pipe and container which is desired to be kept contaminant free and sealed from the atmosphere.

It is common practice to provide fluid storage tanks, such as gasoline, etc., to be stored underground with a pipe, accessible from the ground surface, leading thereto. A very common example of this type storage is the gasoline storage tanks for service stations. In these cases, the end of the inlet pipe is generally recessed into the concrete. It is very important to keep the contents of these tanks, i.e., the gasoline, contaminant free and also to prevent the escape of fumes from the tank.

Caps and seals for these pipes have long been used. Many such caps required the use of two hands to lock and seal the cap and open the cap. In these devices, it was very often difficult to insure a simultaneous locking of the entire cap structure and thus there would not be a good seal between the cap and the pipe. In addition, the previous caps frequently utilized O-ring seals which were not entirely satisfactory. When the O-ring was attached to the cap, they would often get stiff and crack and fall out. If the O-ring was placed on the end of the pipe, it would have a tendency to roll and slide and thus prevent a proper seal.

Many of the previous problems and disadvantages were overcome by the cap and locking means therefor disclosed in Wilson et al., U.S. patent application Ser. No. 821,290 filed May 2, 1969, refiled Mar. 19, 1971 as Ser. No. 126,365, and assigned to the assignee of the present invention.

Accordingly, an object of this invention is to provide an improved cap and sealing means therefor for locking a cap on a pipe or the like.

An additional object of this invention is to provide a cap having a novel sealing means wherein a proper seal is effected each time the cap is attached and locked in place.

A further object of this invention is to provide locking members which coact with an adaptor ring so as to provide sufficient pressure to insure proper sealing between the seal and the adaptor ring and also to provide optimum locking pressure to maintain a cap in locked engagement with the adaptor ring.

SUMMARY OF THE INVENTION

This invention provides an improved cap and sealing means for attachment to the end of a pipe for sealing the end of such pipe. The cap comprises a novel seal member which engages an adaptor ring to provide an improved seal therebetween when the cap locking arms are brought into engagement with the adaptor ring and urged into the locking position. The cap and sealing means is of simple and economical construction, is easy to operate with one hand, produces an improved seal, and uses pivoted locking arms which are simultaneously actuated so that there is equal distribution of forces on the sealing member to insure an efficient seal.

Other details, uses, and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
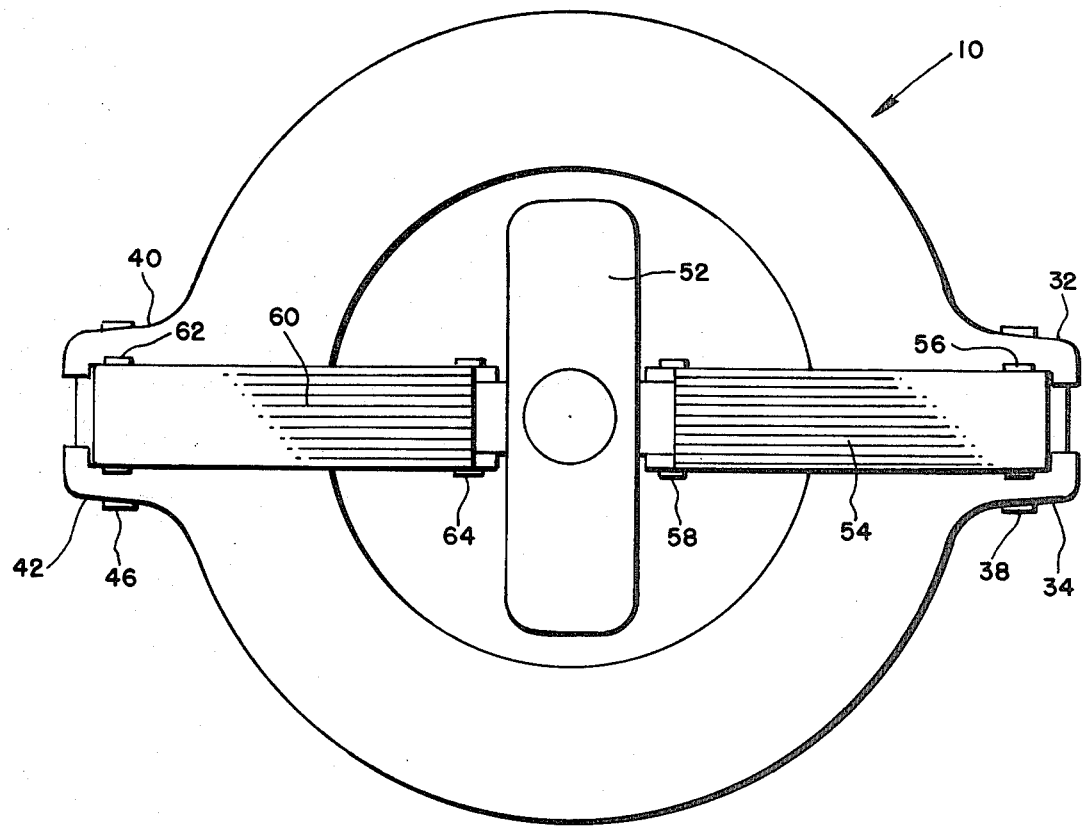
FIG. 1 is a top plan view of the cap.
Figure 2:
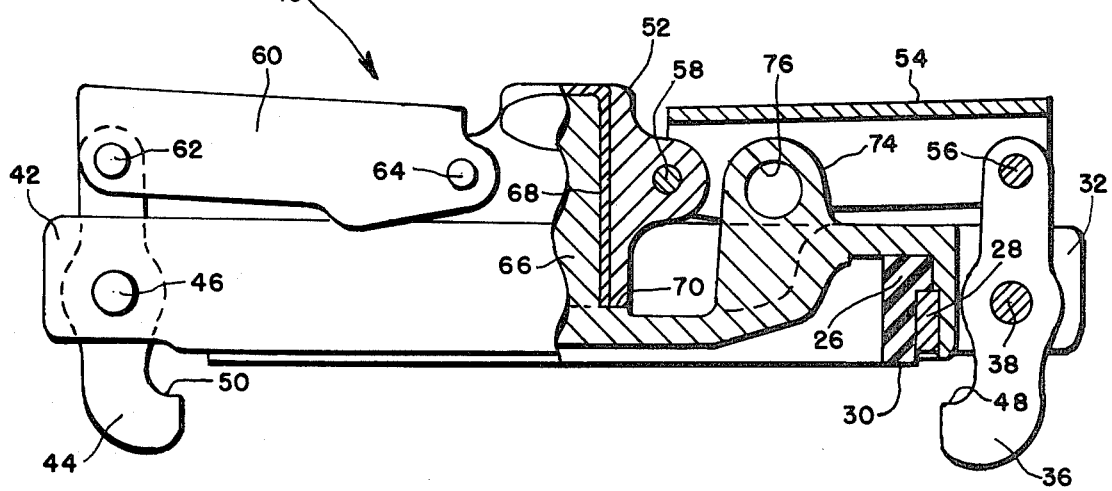
FIG. 2 is an elevation view, partially in cross section, showing the actuating mechanism of the locking arms in the locked position.
Figure 3:
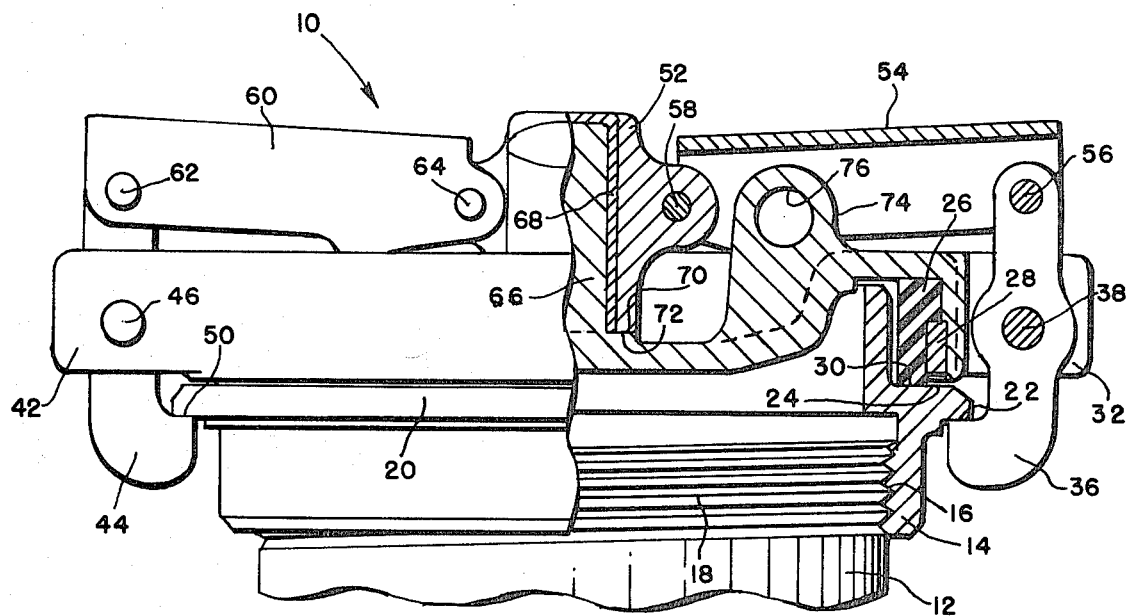
FIG. 3 is a view, similar to FIG. 2, showing the cap in locked and sealing engagement with an adaptor ring which is secured to the end of a pipe.
Figure 4:
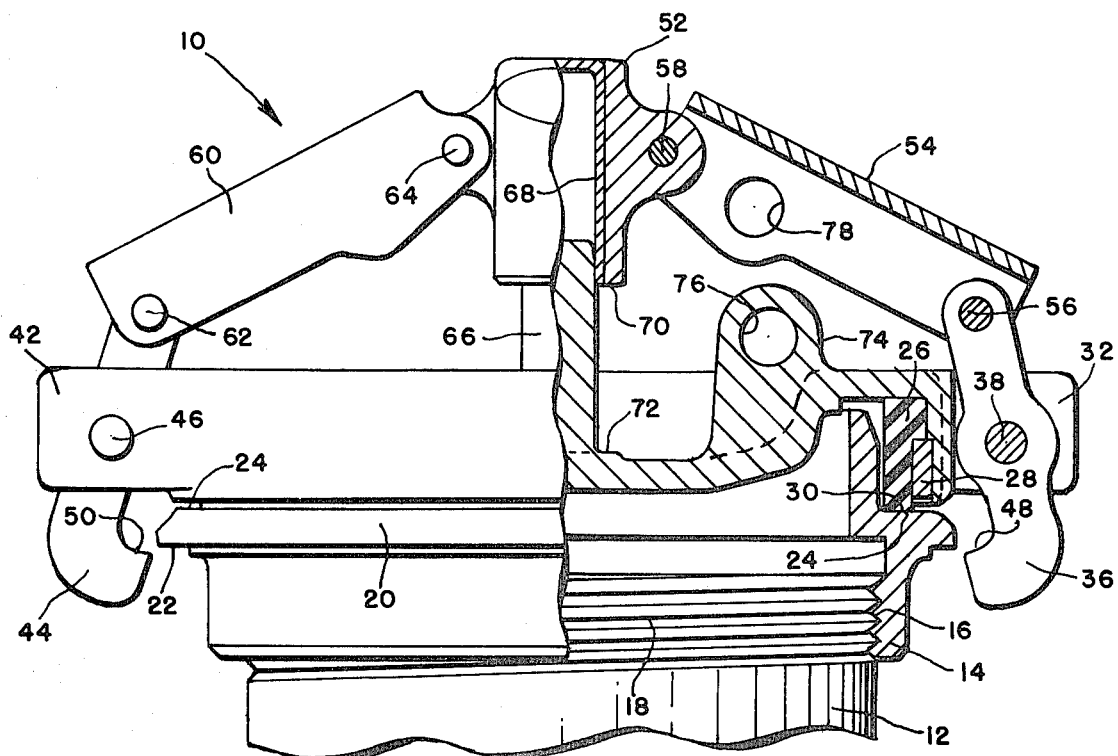
FIG. 4 is a view, similar to FIG. 3, but showing the actuating mechanism of the locking arms moved to the position in which the locking arms are not in the locking position.

Reference is now made to the drawings, which illustrate one exemplary embodiment of the improved cap and sealing means of this invention, which is designated generally by the reference numeral 10. As seen in FIGS. 3 and 4, the cap 10 is used to close the end of the pipe 12 which may be connected to the tank or the like containing gasoline, for example. The tank may be disposed beneath the ground, and the pipe 12 would extend upwardly therefrom to the ground level or above.

An adaptor ring 14 is attached to the end of the pipe 12 by any suitable means, such as cooperating threads 16 and 18. The adaptor ring 14 is formed with a circumferential flange 20 which has substantially flat parallel opposing sides 22 and 24. The flange 20 forms a substantially right angle with the adaptor ring 14.

The cap has a sealing gasket 26 mounted therein for cooperation with flat reaction surface 24 of flange 20 of the adaptor ring 14 to form a seal between the cap 10 and the adaptor ring 14 to prevent the escape of any fumes or fluid or the entrance of any contaminant when the cap 10 is locked in place with the adaptor ring 14. The sealing gasket is generally L-shaped and is made from any suitable material for use with gasoline such as buna-n. The gasket 26 is held in place by a ring 28 which is preferably press-fitted into the cap 10. The ring 28 cooperates with the foot portion of the sealing gasket 26 so that the gasket 26 is held in place in the cap 10. With the ring 28 engaging the foot portion of the gasket 26, the gasket will not fall out of cap 10 when the cap 10 is removed from the adaptor ring 14. The sealing gasket 26 extends a short distance below the bottom edge of the cap 10 and terminates in a flat surface 30. As seen in FIGS. 3 and 4, the flat surface 30 engages the flat surface 24 of flange 20 to make the seal between the cap 10 and adaptor ring 14.

The cap 10 has a pair of bifurcated lugs or ears 32 and 34 extending from one side thereof with a locking arm 36 pivotally mounted therebetween by pin 38. Diametrically opposed to the lugs 32 and 34 is a second pair of bifurcated lugs or ears 40 and 42 which have a locking arm 44 pivotally mounted therebetween by a pin 46.

The locking arms 36 and 44 have a substantially flat surface 48 and 50, respectively, which act as a camming surface to engage and cooperate with the flat reaction surface 22 of flange 20.

The locking arm 36 is connected to a handle 52 by a double pivoted lever 54. The lever 54 is pivotally attached to the locking arm 36 by a pin 56 and is pivotally attached to the handle 52 by a pin 58.

The locking arm 44 is similarly attached to the handle 52. A lever 60 is pivotally attached to the locking arm 44 by a pin 62 at the one end and is pivotally attached by a pin 64 at the other end to the handle 52.

The handle 52 is slidably mounted on a projecting shaft or stud 66 of the cap 10 by being formed with a centrally disposed passage. A bushing or bearing 68 is fixed to the surface of the centrally disposed passage in the handle 52 to more easily slide on the shaft or stud 66.

In operation, the cap 10 is placed over the adaptor ring 14 so that the sealing gasket 26 engages the flange 20 as seen in FIG. 4. Thus, the flat surface 30 and 24 are in sealing engagement. Movement of the handle 52 in a downward direction or toward the cap 10 causes the locking arms 36 and 44 to pivot about pins 38 and 46, respectively, until the flat surfaces 48 and 50 simultaneously engage the flat surface 22 of the flange 20. The pivoting action of locking arms 36 and 44 causes the flat surfaces 48 and 50 to initially move radially inward at a slight angle to the flat surface 22 but then the surfaces flatten out and in effect pull the cap 10 downward to insure a proper seal between sealing surfaces 30 and 24. Movement of the handle 52 toward the cap 10 is limited by engagement of end 70 of the handle 52 with a flat surface 72 of the cap 10.

When the handle 52 has moved to the position of FIG. 3, a plane connecting the pivot pins 58 and 64 is disposed closer to the cap 10 than a plane connecting the pivot pins 56 and 62. This configuration insures that the locking arms 36 and 44 remain in the locking position until the handle 52 is pulled upwardly. Thus, any force on the cap 10 due to pressure within the tank to which the pipe 12 is connected causes a tighter locking force.

A lug 74 extends upwardly from cap 10 and has an aperture 76 formed therein which is in alignment with an aperture 78 formed in the lever 54 when the cap is in the locking position of FIG. 3. With the apertures 76 and 78 in alignment, any suitable locking means may be passed therethrough to prevent unauthorized removal of the cap 10 from the adaptor ring 14.

To remove the cap from the end of the pipe 12 and adaptor ring 14, it is only necessary to raise the handle 52. This movement of handle 52 will cause an outward pivoting of locking arms 36 and 44 as shown in FIG. 4. The upward movement of the handle 52 is limited by the levers 54 and 60 which respectively connect the handle 52 with the locking arms 36 and 44. The upward movement of the handle 52 is limited such that the handle 52 will always remain supported on the shaft or stud 66 of the cap 10.

While the present embodiment has shown the cap 10 as being circular, it should be understood that the cap could have any configuration. It is only necessary that the handle 52 be disposed at the center of the cap 10 to insure an equal distribution of the actuating force is applied to each of the locking arms 36 and 44.

An advantage of this invention is that a cap may be locked in sealing relation to a pipe with only one hand required. Another advantage of this invention is that there is simultaneous locking of all of the locking arms. A further advantage of this invention is that it insures that there is an equal locking force applied on each of the locking arms. Still another advantage of this invention is that only a single motion is required to lock the cap on the end of the pipe. A still further advantage is that no additional space is required for the actuating mechanism for the locking arms. Yet another advantage of this invention is that there is an equal distribution of force on the seal of each of the locking arms. Thus, it can be seen that this invention accomplishes the objectives hereinbefore set forth.

While the present exemplary embodiment of this invention has been illustrated and described, it will be recognized that this invention may be otherwise variously embodied and practiced by those skilled in the art.

What is claimed is:

1. Apparatus for closing the end of a pipe, comprising an adaptor ring for connection to the end of a pipe, a circumferential flange on said adaptor ring extending radially outwardly therefrom and having opposed surfaces, a cap adapted to be mounted over the end of said ring to close the end of said pipe, sealing means in said cap to engage one of said opposed surfaces of said flange when said cap is placed over said ring, said sealing means comprising a circumferential gasket having an L-shaped cross-sectional configuration, one leg of said L-shaped gasket extending downwardly beyond the bottom of said cap to engage and seal with said one surface of aid flange, the other leg of said L-shaped gasket extending radially outwardly into engagement with an annular wall in said cap, annular ring means secured to said cap adjacent said annular wall and engaged with the underside of said radially extending leg of said L-shaped gasket to hold said gasket in place in said cap, and locking means on said cap to lock said cap to said adaptor ring.

2. Apparatus as in claim 1, wherein said annular wall depends from the periphery of said cap and the lower portion thereof is diametrically enlarged relative to the upper portion thereof to define an annular downwardly facing shoulder thereon, the radially extending leg of said gasket engaged with said upper portion and the width of the upper portion being commensurate with the width of said radially extending leg of said gasket.

3. Apparatus as in claim 2, wherein said annular ring means is positioned against the lower portion of said wall and against said downwardly facing shoulder.

4. Apparatus as in claim 3, wherein said annular ring means is press-fitted to said cap.

5. Apparatus as in claim 4, wherein said annular ring means is rectangular in cross-section, with the longest dimension thereof parallel to said downwardly extending leg of said gasket.

6. Apparatus as in claim 4, wherein said gasket is made from buna-n.

7. Apparatus as in claim 1, wherein the extreme lower end of the downwardly extending leg of said gasket is a substantially flat surface, and said one surface of said flange is substantially flat, said flat surfaces engaging with one another to effect said seal.

8. Apparatus as in claim 1, wherein the locking means includes means engaging said flange on said adaptor ring to urge said cap toward said adaptor ring and lock said gasket in sealing engagement with said flange.

* * * * *